Patented Apr. 3, 1928.

1,664,631

UNITED STATES PATENT OFFICE.

WILLIAM KOEHLER, OF CLEVELAND, OHIO.

PROCESS FOR THE PRODUCTION OF REFRACTORY MAGNESIA COMPOUNDS.

No Drawing.    Application filed March 15, 1926.  Serial No. 94,961.

This invention relates to a new and improved process for the production of refractory magnesia compounds.

The object of the invention is to provide a simple and economical method for the production of high grade refractories, such as magnesium ferrite, magnesium aluminate, (synthetic spinels), magnesium chromates and other earth metal oxides and compounds thereof.

My invention in general consists in treating dolomite in a comminuted condition with a soluble metal chloride or chlorides or with a mixture of soluble metal chloride and a metallic oxide equivalent to the lime content of the dolomite or magnesia lime compound, drying the mass and heating it to a comparatively low temperature but sufficiently high to dehydrate the mass and expel the carbonic acid associated with the lime content, then washing out the soluble chloride and calcining the residue after filtration and drying.

In carrying out my process, I preferably take a quantity of dolomite and reduce the same to a comminuted condition. The comminuted dolomite is then brought into intimate association with a quantity of a metal chloride, such as iron chloride or aluminum chloride. The quantity of the metal chloride should be such that the chlorine radical will be equivalent to the lime calcareous content of the dolomite in order that the lime content of the dolomite may be fully converted into calcium chloride.

In case it be found not advisable, on account of local conditions or other reasons, to employ the full amount of the iron chloride or aluminum chloride, a definite quantity of a soluble chloride, such as magnesium chloride, may be added to the mixture and the combined chlorine radicals of either the iron chloride and the magnesium chloride or the aluminum chloride and the magnesium chloride should be equivalent to the lime content of the dolomite. Also when necessary or expedient a predetermined quantity of a metal oxide may be employed instead of the metal chloride, in conjunction with sufficient magnesium chloride to make the chlorine radical equal to the lime equivalent of the dolomite, that is, instead of the iron chloride mentioned in the first instance, a quantity of iron oxide may be employed, and sufficient magnesium chloride then added to make the chlorine radical equal to the lime equivalent of the dolomite. Also, instead of the aluminum chloride, a quantity of alumina oxide may be employed, and sufficient magnesium chloride added to again make the chlorine radical equal to the lime equivalent of the dolomite.

The mixture of the comminuted dolomite and the metal chloride or chlorides or the mixture of the dolomite and the metal oxides and magnesium chloride is then dried and heated from 100° to 200° C. thereby dehydrating the mass and expelling the carbonic acid associated with the lime content of the dolomite, and converting the lime into calcium chloride and the magnesium chloride into magnesium oxide and magnesium hydroxide.

After decomposition has taken place the mass is treated with water to dissolve out the calcium chloride formed through the reaction. The mass may then be floated, filtered, washed and dried, and is then calcined at a high temperature to expel all the carbonic acid from the magnesium carbonate and sinter and shrink the whole mass to the desired density.

The resultant product will be magnesium ferrite or magnesium aluminate or magnesium chromate or a mixture of these, according to the metal chlorides or the metal oxides employed in the reaction.

In order to eliminate any free lime which may have escaped decomposition and which might produce deleterious effect due to its slacking properties alumina may be added in slight excess to effect the production of calcium aluminate.

In order to make the process regenerative as far as magnesium chloride is concerned a quantity of calcined or dead burned comminuted dolomite may be treated with its magnesium equivalent of the calcium chloride produced in the first reaction, in the presence of the carbonic acid also produced in the first reaction and in calcining the dolomite. The resultant reaction will produce calcium carbonate and magnesium chloride through the chlorination of the magnesia of the dolomite.

The process may be illustrated by the following equations:

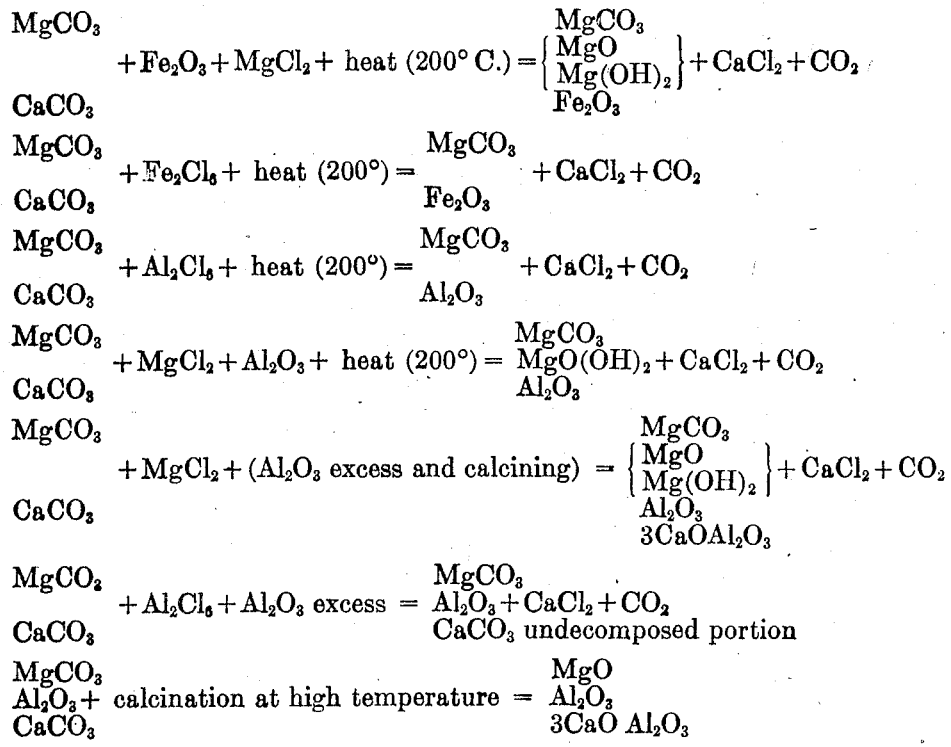

In this application, the term "dolomite" refers to the well known natural uncalcined mineral product, magnesium-calcium carbonate, the composition of different deposits of which may vary greatly. The expression "mixed magnesium carbonate and calcium carbonate bearing material" is used to describe mixtures of different dolomitic limestones which collectively have the desired final percentages of magnesium carbonate and calcium carbonate.

What I claim is:—

1. A process for the production of an oxide from dolomite comprising treating comminuted uncalcined dolomite with its lime equivalent of a metallic chloride, moderately heating the mixture, dehydrating the mass, dissolving out the calcium chloride formed and calcining the residue.

2. A process for the production of mixed oxides from dolomite comprising treating comminuted uncalcined dolomite with its lime equivalent of magnesium chloride and a metallic oxide, heating the mixture to about 200° C., washing out the calcium chloride formed and after filtration, floatation and drying, calcining the resultant mixture at a high temperature.

3. A process for the treatment of dolomite or mixed magnesium carbonate calcium carbonate bearing material to produce mixed oxides other than the lime and the magnesia as existing in the original material comprising treating comminuted uncalcined dolomite or said mixture with its lime equivalent of a metallic chloride, moderately heating the mixture, dehydrating the mass, dissolving out the calcium chloride formed and calcining the residue.

4. The treatment of uncalcined dolomite or mixed magnesium carbonate calcium carbonate bearing materials with a predetermined quantity of iron oxide, a solution of magnesium chloride equivalent to the lime content of the dolomite or said mixture, and aluminum chloride sufficient to convert any lime which may have escaped decomposition into calcium aluminate, heating the mass to approximately 200° C., dissolving out the calcium chloride formed with water, then after washing, filtration, floatation, settling or filtering and drying, calcining the resultant product at a temperature sufficiently high to shrink and sinter same to the desired density.

5. The treatment of uncalcined dolomite or mixed magnesium carbonate calcium carbonate bearing material with a metallic oxide and a soluble metallic chloride in the presence of water and adding thereto sufficient aluminum chloride to convert to calcium aluminate any lime that may have escaped conversion into calcium chloride, heating the mass to approximately 200° C., thereby dehydrating and converting the same to mixed oxides, calcium chloride, magnesium carbonate and calcium aluminate, then dissolving out the calcium chloride with water, then after washing, filtration, floatation, settling and drying, calcining the resultant product at a temperature sufficiently high to shrink and sinter the same to the required density for a commercial product.

6. The treatment of uncalcined dolomite or mixed magnesium carbonate calcium carbonate bearing material with a quantity of mixed metallic oxides and soluble metallic chloride, dehydrating the mass and heating to approximately 200° C., dissolving out the calcium chloride with water, then washing, filtering and drying and thereafter calcining the mass at a sufficiently high temperature to shrink and sinter the mass to a commercial product.

7. The treating of uncalcined dolomite or mixed magnesium carbonate calcium carbonate bearing compounds with an aluminum chloride and moderately heating the mass to produce mixed oxides and calcium chloride and making inert for refractory purposes any lime which has escaped decomposition by converting the same into calcium aluminate.

8. As a step in a process for producing a mixture of metal oxides of predetermined content the adding of measured quantities of an earth metal chloride and magnesium chloride to comminuted uncalcined dolomite and heating the resultant mixture to about 200° C.

9. The method which comprises treating a comminuted mass containing uncalcined natural magnesium carbonate and calcareous materials with a reagent containing a soluble heat-decomposable metallic chloride, heating the mass to about 200 degrees C. until the reaction is completed, recovering the evolved gaseous products, dissolving soluble matter from the residue, and washing, filtering, and drying the remainder.

10. The method which comprises associating a comminuted uncalcined mass containing natural magnesium carbonate and calcareous materials with a soluble heat-decomposable metallic chloride and iron oxide, subjecting the associated materials to a moderate heat until the ensuing reaction is complete, and purifying the resulting product.

In testimony whereof I affix my signature.

WILLIAM KOEHLER.